United States Patent [19]
Takagi

[11] Patent Number: 5,062,096
[45] Date of Patent: Oct. 29, 1991

[54] OPTICAL HEAD AND TRACKING METHOD USING SAME

[75] Inventor: Masaaki Takagi, Tokyo, Japan

[73] Assignee: Copal Company Limited, Tokyo, Japan

[21] Appl. No.: 287,291

[22] Filed: Dec. 20, 1988

[30] Foreign Application Priority Data

Dec. 25, 1987 [JP] Japan ................. 62-327444

[51] Int. Cl.$^5$ .................................. G11B 7/00
[52] U.S. Cl. ..................... 369/44.38; 369/44.12
[58] Field of Search ............. 369/44.26, 44.37, 44.38, 369/109, 44.12, 44.23

[56] References Cited

U.S. PATENT DOCUMENTS

| | | | |
|---|---|---|---|
| 3,913,076 | 10/1975 | Lehureau et al. | |
| 4,498,159 | 2/1985 | Daimon | 369/44.38 |
| 4,532,522 | 7/1985 | Tsunoda et al. | 369/44.38 |
| 4,720,825 | 1/1988 | Kokado | 369/44.37 |
| 4,753,513 | 6/1988 | Shikama | 369/44.12 |
| 4,817,072 | 3/1989 | Toide et al. | 369/44.12 |

FOREIGN PATENT DOCUMENTS 0241942 10/1987 European Pat. Off.
2533732 3/1984 France.

OTHER PUBLICATIONS

Patent Abstracts of Japan, vol. 8, No. 72, Apr. 4, 1984; JP-A-58 218033, Dec. 19, 1983.
Patent Abstracts of Japan, vol. 7, No. 286, Dec. 21, 1983; JP-A-58 161154, Sep. 24, 1983.
Patent Abstracts of Japan, vol. 11, No. 45, Feb. 10, 1987, JP-A-61 214240, Sep. 24, 1986.

*Primary Examiner*—Donald McElheny, Jr.
*Attorney, Agent, or Firm*—Finnegan, Henderson, Farabow, Garrett & Dunner

[57] ABSTRACT

An optical head usable also with a WORM-type optical disk device includes a diffracting optical system which is located in the optical path of a light beam and which diffracts the light beam so as to produce at least three diffracted light beams, and three light-receiving elements which receive the reflected light beams of the three diffracted light beams from the surface of an optical disk. The diffracting optical system is arranged so as to establish a positional relationship in which the three or more diffracted light beams do not lie on a single straight line in the cross-sectional distribution thereof. Among the three diffracted light beams, one lying at the foremost or rearmost position in the forward rotating direction of the optical disk is employed for generating a focusing servo signal or for reading or writing data, and the remaining two are employed for generating a tracking servo signal.

12 Claims, 10 Drawing Sheets

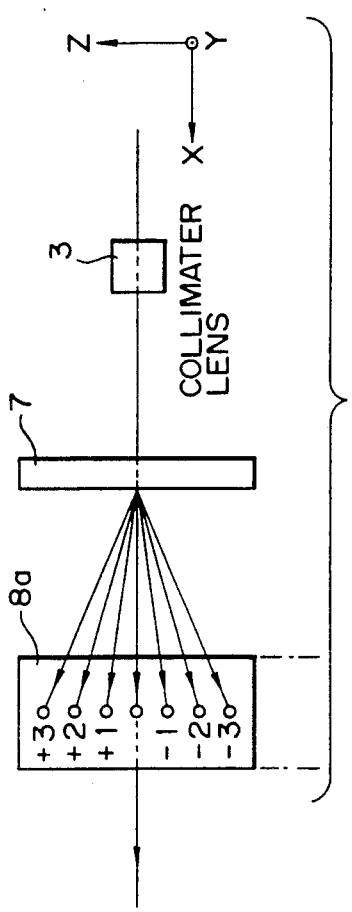
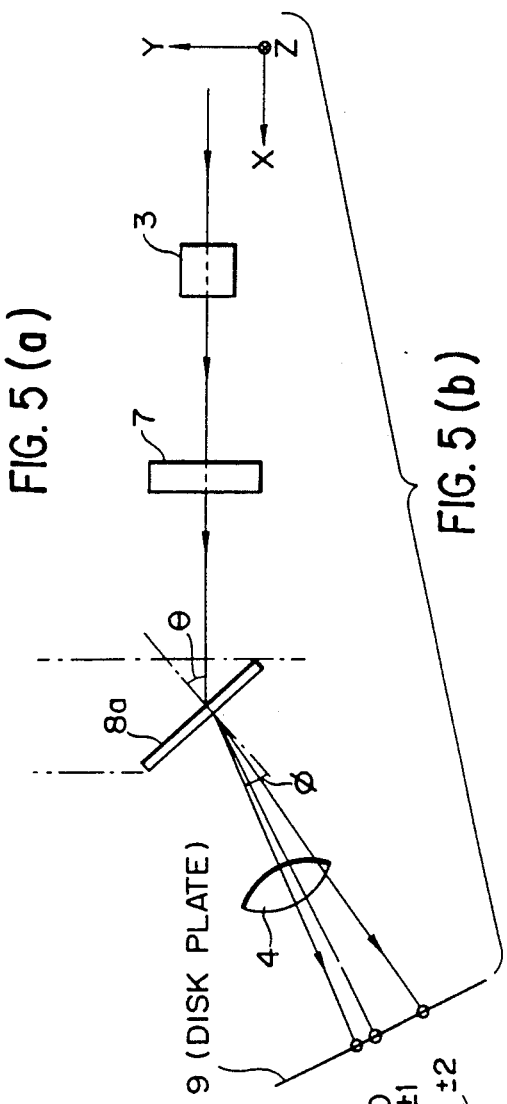
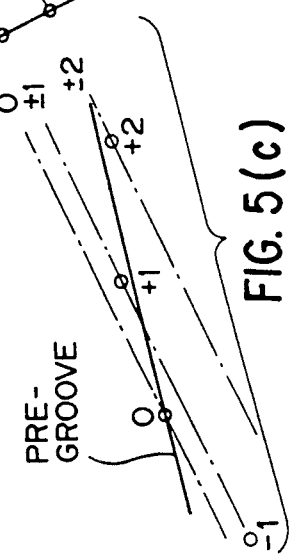
FIG. 5(a)
FIG. 5(b)
FIG. 5(c)

OPTICAL HEAD AND TRACKING METHOD USING SAME

BACKGROUND OF THE INVENTION

The present invention relates to an optical head used for writable-type optical disks, and to a tracking method which employs the optical head. More particularly, the invention relates to improvements in a conventional so-called tri-beam method.

Optical disks from which data can be read owing to a change in reflection factor and on which data can be written are referred to as WORM (WRITE-ONCE READ-ONLY MEMORY)- or DRAW-type optical disks. Generally, in each of these optical disks, a recording material such as Te (tellurium) is vaporized by irradiation with a laser beam, thereby to form pits in the surface of the disk. Data is read from the disk on the basis of the difference between the reflection factors (the reflection intensities) of the pitted parts and unpitted parts of the disk surface. In particular, a phase change-type optical disk has recently been developed as an erasable optical disk. In this optical disk, the phase state of a recording material is changed by the difference between the power levels of an irradiating laser beam. On the basis of the changes in phase state, changes in the reflection factors of the unchanged and changed parts of the recording material are read as data. Since the changes in the phase state are reversible, the optical disk of the phase change-type possesses an erasability property.

Meanwhile, methods of tracking ordinary optical disks, in which playback-only optical disks (also including so-called CD's) are also included, are classified into (1) the so-called tri-beam method and
(2) the so-called push-pull method.

The triple-beam method (1) is chiefly adopted for the tracking of a playback-only optical disk as stated in, for example, Japanese Patent Publication (KOKOKU) No. 58-56164. The principle of the tri-beam method is illustrated in FIG. 9A. According to this method, secondary light (corresponding to light of orders ±1 in FIG. 9A) is produced from a laser beam by the use of, for example, a diffraction grating, the reflected light of the secondary light from the surface of the optical disk is received by photodetectors 200, 202 shown in FIG. 9B, and a tracking servo signal is generated on the basis of the difference between the output signals of the detectors and is utilized for tracking. The servo tracking is performed so as to equalize the received quantities of light of order −1 and order +1.

On the other hand, the push-pull method (hereinafter referred to as the "PP method") (2) performs servo tracking in such a manner that, as stated in U.S. Pat. No. 3,913,076 (Japanese Patent Publication No. 55-26529), etc., a tracking servo signal is formed from an interference wave between reflected light from a pre-groove formed in the surface of the optical disk beforehand and reflected light from outside the pre-groove, whereupon an objective for focusing a laser beam on the disk is shifted in accordance with the signal. This PP method is chiefly adopted for the servo tracking of the writable optical disk.

The reason why the tri-beam method is adopted for the playback-only optical disk and the PP method for the writable optical disk in this manner is as follows: Although the triple-beam method poses no problem when playing back an optical disk already written on, a problem does arise as to tracking during the formation of pits in a data writing operation. The following is the reason:

When data is written on the recording surface of the optical disk, pits are formed anew along a track (a pre-groove) on a blank disk. Accordingly, with a boundary at a position which is being irradiated with the laser beam, the pits are already formed in the part of the track behind the irradiated position, whereas no pit is yet formed in the part of the disk ahead of the irradiated position. In consequence, when the disk has the data written thereon while being tracked by the tri-beam method, the reflection intensity $I_{-1}$ of the laser beam from the part not yet pitted and the reflection intensity $I_{+1}$ thereof from the part already pitted as indicated in FIG. 10B give rise to a difference ($I_{-1} > I_{+1}$ in the example of FIG. 10B) in the course of the writing operation. Therefore, even in a case where the pre-groove lies exactly midway between the two beams, an unfavorable deviation develops between the output signals (signals E and F) of the respective detectors 200, 202.

If an effort is made to use the tri-beam method also for tracking in the writing operation, the above deviation can be cancelled by applying a gain ratio (an offset value $\alpha$) between the outputs (signals E and F) of the detectors 200 and 202 and then setting the tracking signal to $$E - \alpha F$$

However, since the light reflection factor of the pitted data part differs depending upon the type of optical disk, the method of applying the offset cannot produce stable tracking signals unless the deviations are compensated for by changing the offset values as, for example, $\alpha_1, \alpha_2, \ldots$ for the respective different materials of the optical disks. In actual practice, however, it is impossible to change the offset value for every material in this manner. That is, the application of the tri-beam method to the writing operation of the optical disk involves a first problem in which compensation cannot be made for fluctuations in the reflection factors corresponding to the materials of the optical disks.

On the other hand, if the tri-beam method is applied to playback of the optical disk already written on, the reflection intensities of the light of the orders +1 and −1 from areas before and behind a data reading pit are equal ($I_{-1} \approx I_{+1}$) in the course of reading the pit, as illustrated in FIG. 10A. It is therefore unnecessary to provide the photodetection signals with the offset as in the writing operation. In other words, the tri-beam method is disadvantageous in that it is necessary to contrive circuitry which distinguishes between the writing mode and the reading mode and then applies the aforementioned offset only in the former. This is the second problem encountered in the tri-beam method.

On the other hand, since the PP method utilizes the interference between the reflected light from the pre-groove and from outside this pre-groove as stated before, it does not cause the offset ascribable to the difference in the reflected light intensities in the writing operation as in the case of the triple-beam method. However, since the objective is displaced for tracking as explained above, the reflected light beams from the disk shift transversely and it is eventually required to provide the servo signal with an offset magnitude. The control of this offset is complicated and is unsuited to inexpensive playback-only optical disks such as CD's. In the last analysis, the PP method is mainly adopted for optical disks requiring high precision.

Thus, both the tri-beam method and the PP method, which are the typical tracking methods, involve some disadvantages. The former is unsuitable especially for the writable (WORM type) optical disk, while the latter is suitable for the writable optical disk but leaves the problem of the lens shift unsolved.

SUMMARY OF THE INVENTION

The present has been devised in order to eliminate the disadvantages of the prior art, and its object is to provide a tracking method based on a novel tri-beam method capable of stable tracking in both the modes of writing data onto an optical disk and reading data from the optical disk and independently of the optical disk material, as well as an optical head to which the tracking method is applied.

According to the present invention, the foregoing object is attained by providing an optical head having light beam generating means for generating a light beam, and being usable for WORM type and phase change-type optical disk devices, comprising diffraction means located on an optical path of the light beam for diffracting the light beam into a plurality of diffracted light beams, the plurality of diffracted light beams being generated in a number of at least three so as to establish a positional relationship in which they do not lie on a single line in a cross-sectional distribution thereof (here a reflected light beam from an optical disk, which reflected light beam is one of the three diffracted light beams that lies at a foremost or rearmost position in a forward rotating direction of the optical disk, is employed for reading or writing data), and two first light-receiving means disposed on an optical path of reflected light of the remaining two diffracted light beams from the optical disk, and arranged at different positions so as to receive the reflected light beams in order to produce a tracking servo signal.

Further, according to the present invention, a tracking method for an optical head usable for WORM-type and phase change-type optical devices comprises the steps of: producing three diffracted light beams from a single light beam so as not to lie on a single straight line in a cross-sectional distribution thereof; employing as a beam, for reading or writing data, a reflected light beam from an optical disk, of one of the three diffracted light beams which lies at a foremost or rearmost position in a forward rotating direction of the optical disk; and employing reflected light beams of the remaining two diffracted light beams from the optical disk as beams for tracking.

With the optical head and the tracking method according to the present invention, the plurality of diffracted light beams fall into a positional relationship in which they do not lie on a single straight line in the cross-sectional distribution thereof, so that two of them can be employed for tracking. In addition, the data reading or writing diffracted light beam is projected on the foremost (or rearmost) position in the forward rotating direction of the optical disk, namely on a position lying ahead of (or to the rear of) the two diffracted light beams for producing the tracking signal. Accordingly, the two diffracted light beams for producing the tracking signal are projected on areas in which data items has already been written (or areas in which data has not yet been written), in both a writing mode and a reading mode, so that both the reflected light beams of the two diffracted light beams are obtained under the same condition. In consequence, stable and precise tracking signals can be obtained in both the writing mode and reading mode.

In one aspect of the present invention, the diffraction means comprises diffraction grating located perpendicular to an optical axis of the light beam from the light beam generating means, and a prism so disposed that the diffracted light beams from the diffraction grating enter it obliquely. The refracted light beams of the at least three diffracted light beams from the prism are projected perpendicularly to a surface of the optical disk.

Beam shaping can be realized simultaneously with the function of obtaining the plurality of diffracted light beams in the positional relationship in which they do not lie on the single straight line in the cross-sectional distribution thereof, so that the optical head can be reduced in size and lowered in cost.

In another aspect of the present invention, the diffracted light beam lying at the foremost or rearmost position is a light beam of order 0, and the remaining two diffracted light beams are light beams of orders 1 and 2.

The light spectrum of the order 0 has the largest quantity of light.

In another aspect of the present invention, the optical head further comprises second light-receiving means for receiving the reflected light beam from a surface of the disk, the reflected light being the diffracted light beam which lies at the foremost or rearmost position, a signal from the second light-receiving means being used for playing back the read data or for a focusing servo control operation.

In still another aspect of the present invention, when the diffracted light beam (of the order 0 lying at the foremost or rearmost position lies at the foremost position, the remaining light beams are projected on written areas of a surface of the optical disk in the writing mode and playback mode. Moreover, the remaining diffracted light beams are projected on areas to-be-erased in an erasing mode. Thus, the remaining two diffracted light beams are reflected under the same condition, so that the ratio between the light quantities of the two reflected light beams does not fluctuate in the writing, erasing and reading mode.

In yet another aspect of the present invention, when the diffracted light beam (of the order 0) lying at the foremost or rearmost position lies at the rearmost position, the remaining diffracted light beams are projected on unwritten areas of a surface of the optical disk in a writing mode. Moreover, they are projected on written areas in the playback mode and erasing mode. Thus, the remaining two diffracted light beams are reflected under the same condition, so that the light quantities of the two reflected light beams and the ratio between these light quantities do not fluctuate in the writing, erasing and reading modes.

A further aspect of the present invention is characterized in that the diffraction means comprises a first diffraction grating, and a second diffraction grating which has a grating pattern extending in a direction different from that of a grating pattern of the first diffraction grating. Planes of the first and second diffraction gratings intersect at right angles to the incident light beam.

A still further aspect of the present invention is characterized in that the diffracted light beam lying at the foremost or rearmost position is projected on a pre-groove provided on the optical disk, and the remaining two diffracted light beams are projected on positions which are substantially equidistant from the pre-groove in a direction normal to the pre-groove.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 5(a)-5(c) are views showing an optical path along which a light beam emerging from a collimating lens is shown projected on an optical disk;

DESCRIPTION OF THE PREFERRED EMBODIMENTS

Embodiments of the present invention will now be described with reference to the drawings.

Figure 1:
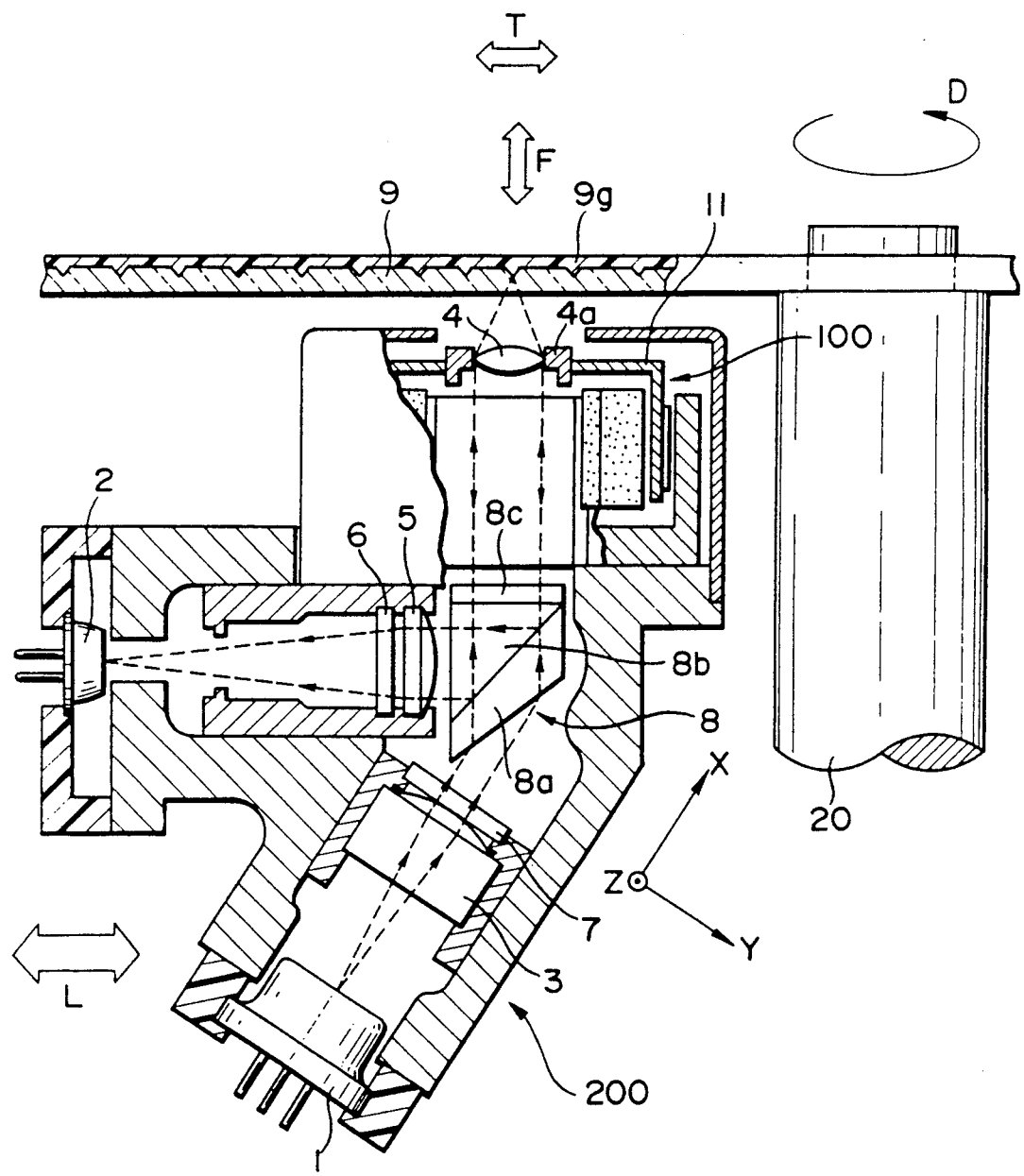
FIG. 1 is a partial sectional view of an optical head of an embodiment to which the present invention is applied.

FIG. 1 is a partially sectional side view showing the essential portions of an optical disk device to which an actuator for an optical head according to one embodiment of the invention is applied. As shown in FIG. 1, an optical disk 9 is formed of a disk provided with a pre-groove 9g in the shape of concentric circles. The optical disk 9 rotates in such a manner that a predetermined turning force in the direction of arrow D is transmitted thereto from a rotary shaft 20 driven by rotation means (not shown), while it is detachably attached to the rotary shaft 20 by attaching means, not shown.

An optical head assembly 200 is fixed to parallel direction drive means, not shown, and is accessible to any desired track of the pre-groove 9g of the aforementioned optical disk 9 through movement in the direction of arrow L, which is the radial direction of the optical disk 9.

As for the construction of the optical head assembly 200, numeral 1 denotes a semiconductor laser which emits a laser beam, and numeral 4 denotes an objective lens which serves to condense the light beam on the pre-groove 9g. An optical block 8 comprises a beam shaping prism 8a, a polarizing beam splitter (hereinafter abbreviated to "PBS") 8b which passes the incident light from the laser 1 and reflects reflected light from the optical disk 9. Shown at numeral 2 is a detector comprising, for example, photodiodes for receiving the reflected light from the PBS 8b. It is well known that a focusing signal and a tracking signal are obtained from the received light signals. In addition, the assembly 200 includes a collimating lens 3 by which the laser beam emitted from the semiconductor laser 1 is converted into a collimated beam and which is disposed at a predetermined distance from the semiconductor laser 1, and a diffraction grating 7 disposed on the exit side of the collimating lens 3 for the collimated beam. The objective lens 4 is mounted on the upper surface 11 of the actuator 100 through a lens holder 4a.

Meanwhile, the collimated light beam reflected from the PBS 8b passes through a condenser 5 as well as a cylindrical lens 6 and is condensed on the detecting surface of the detector 2.

The optical block 8 will now be described in further detail. This block 8 has the following constituents arrayed successively from its side nearest the laser 1:

i) the shaping prism 8a having the property of transmitting P polarized light (the vector of the electric field of which is parallel to the plane of incidence) at a high efficiency and reflecting S polarized light (the electric field vector of which is orthogonal to the plane of incidence) at a high efficiency, and iii) a quarter-wave plate 8c for shifting the phase of the P polarized light a quarter wavelength.

The optical head 200 thus constructed is required to condense the oscillated light, which is emitted by the semiconductor laser 1, on the pre-groove 9g of the optical disk 9 through the objective lens 4 at all times. For this purpose, the actuator 100 referred to above is servo-driven in a focusing direction indicated by arrow F in the figure and in a tracking direction indicated by arrow T.

Figure 2:
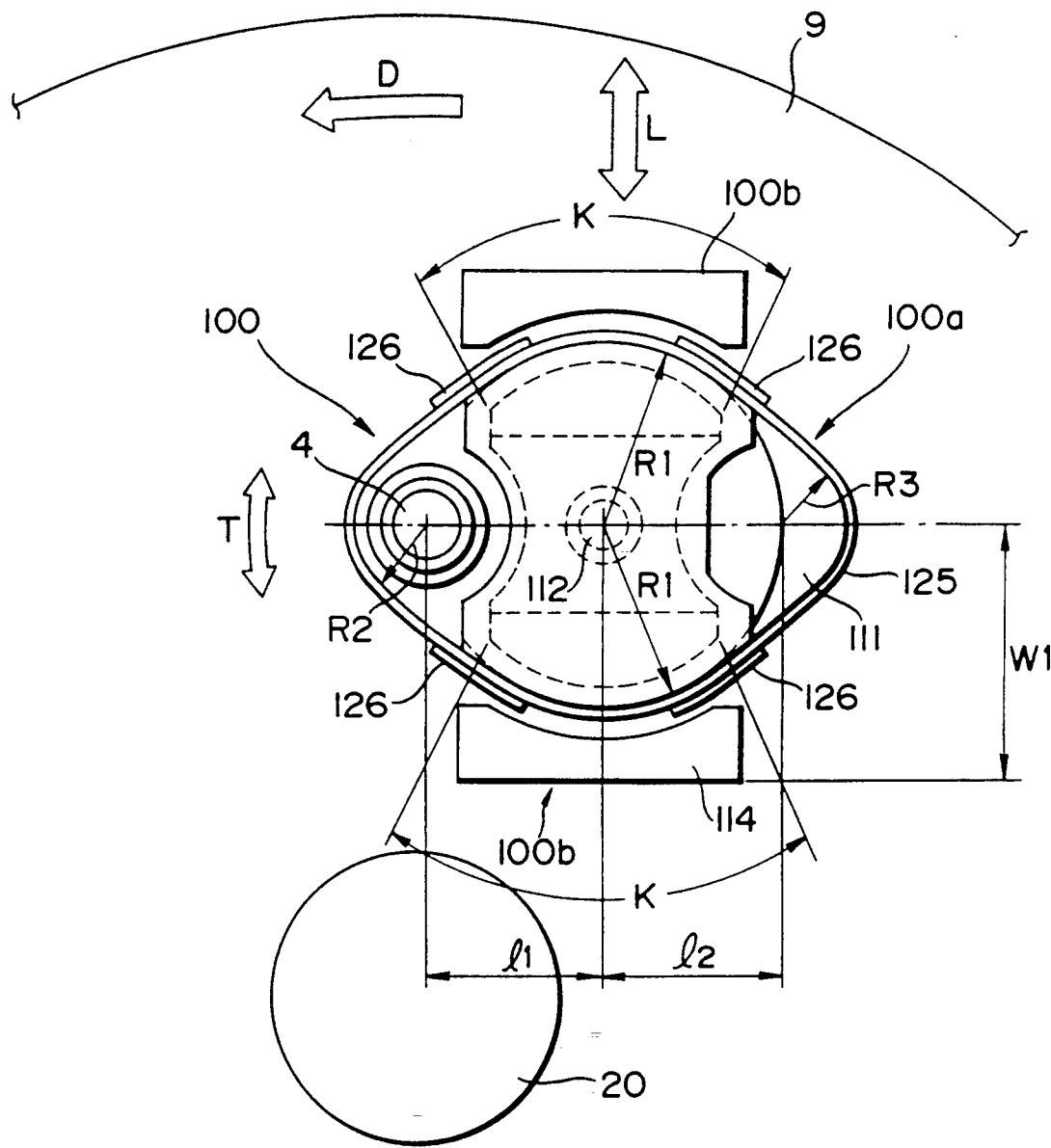
FIG. 2 is partial perspective plan view of an actuator for the optical head in FIG. 1.
Figure 3:
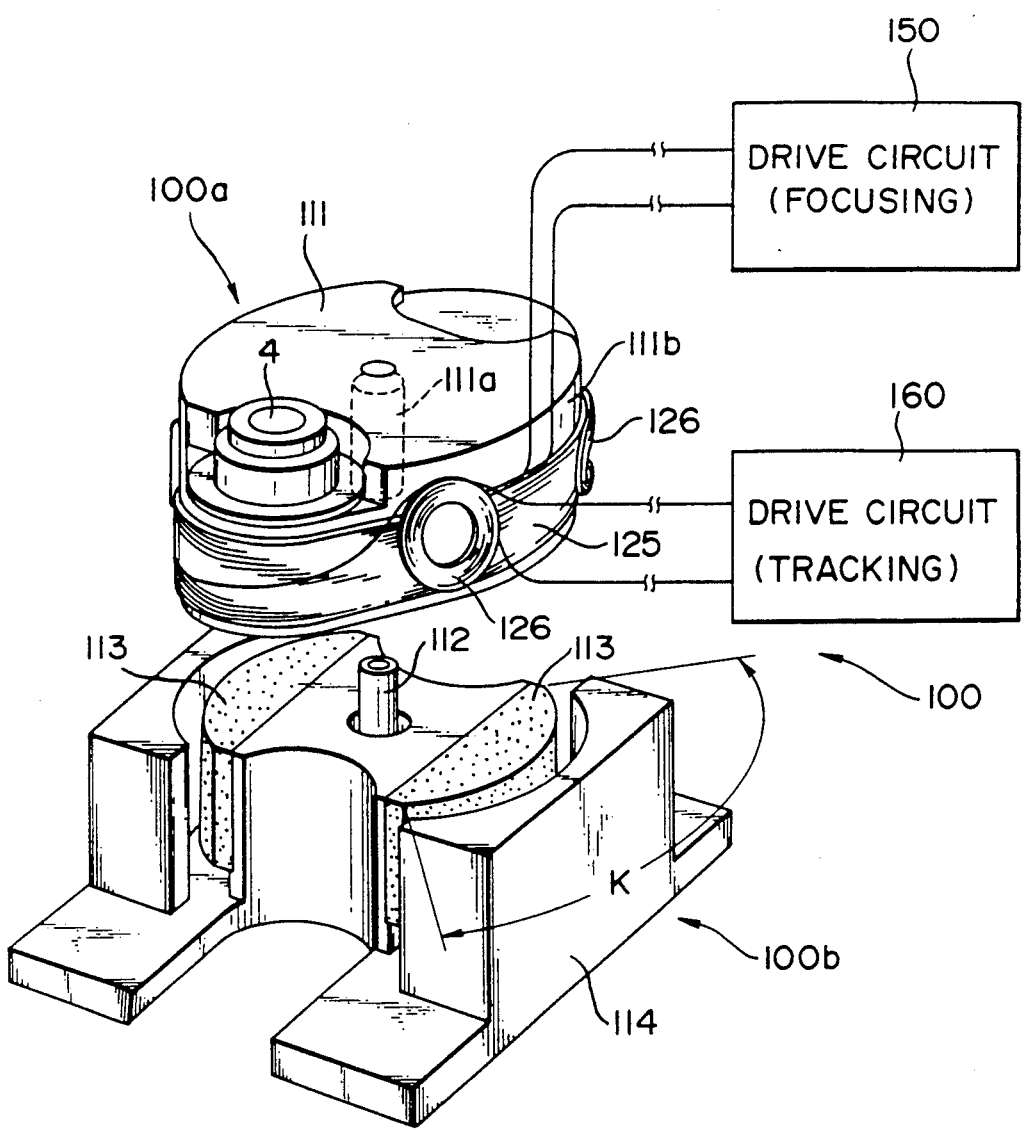
FIG. 3 is an exploded view of the actuator portion of the optical head in FIG. 1.

FIG. 2 is a plan view of the actuator 100 for the optical head stated above, and FIG. 3 is an exploded view of the optical head actuator 100. As shown in FIGS. 2 and 3, the optical head actuator 11 includes a movable member 100a and a yoke member 100b and is assembled and constructed so that the movable member 100a may be loosely fitted around the supporting shaft 112 of the yoke member 100b slidably and turnably. The upper surface of the optical head actuator 100 is substantially elliptical, and an outer peripheral wall 111b depends from the outer edge of the upper surface 111. The contour of the upper surface 111 is substantially in the shape of an ellipse having a minor axis of $2 \times R_1$ and a major axis of $l_1 + l_2 + R_2 + R_3$, but is is accurately formed of two circular arcs of radius $R_1$, one circular arc of radius $R_2$, one circular arc of radius $R_3$ and segmental parts connecting these circular arcs.

A focusing coil 125 is wound round the outer peripheral wall 111b without any clearance therebetween. In addition, two pairs of tracking coils 126 are provided by bonding them to the outer surface of the focusing coil 125. The positions of bonding are determined so that the individual tracking coils 126 may be centered near the ends of the magnetic flux ranges K of the yoke member 100b. A bearing member 111a is formed so as to depend from the central part of the upper surface 111 to the same side as that of the outer peripheral wall 111b.

Since the objective lens 4 is disposed at one end of the major axis side of the upper surface 111, a weight balance for the supporting shaft 112 to be described below is held in such a manner that a weight corresponding to the objective lens 4 is provided on the other end of the major axis side. In this embodiment, the weight balance is maintained by increasing the thickness of the upper surface 111.

The supporting shaft 112 is provided centrally of the yoke member 100b so as to support the aforementioned bearing member 111a in a loosely fit manner. Yoke pieces 114 are erected at both end parts of the yoke member 100b and establish magnetic field in the ranges indicated by K in FIGS. 2 and 3, in cooperation with magnets 113 which are disposed at positions confronting the yoke pieces 114.

A focusing coil-driver circuit 150 is connected to the focusing coil 125, while a tracking coil-driver circuit 160 is connected to the tracking coils 126. Each of the driver circuits is controlled by a servo circuit, not shown.

The operation of the optical head actuator 100 described above will now be set forth. When a predetermined current is caused to flow through the focusing coil 125 of the movable member 100a by the focusing coil-driver circuit 150, the movable member 100a slides in the axial direction of the supporting shaft 112 of the yoke member 100b in accordance with Fleming's law. Further, when predetermined currents are caused to flow through the tracking coils 126 by the tracking coil-driver circuit 160, the movable member 100a turns about the supporting shaft 112 of the yoke member 100b in accordance with Fleming's law. The closed magnetic fields within the ranges illustrated at K act upon the tracking coils 126 which lie within ranges indicated by the radii $R_1$ in FIG. 2, so that sufficient torques are attained for both turning and sliding.

In the above, the construction of the actuator 100 has been chiefly described from the viewpoint of obtaining a sufficient torque when moving the actuator in the focusing direction and a sufficient torque when moving the actuator in the tracking direction. The tracking method employing the optical head will be described next. Although this will become obvious from the ensuing description, it is clearly stated here that the tracking method of the embodiment is not realized only when the actuator shown in FIGS. 2 and 3 is adopted, but that it can also be applied to any actuator of conventional construction merely by fulfilling certain conditions.

This tracking method is characterized by the arrangement of optical elements placed on a laser beam. In order to clarify the arrangement, therefore, the optical path of the laser beam will described first with reference to FIG. 5. A part (a) in FIG. 5 is a diagram of the optical path viewed in the direction of the Y axis, a part (b) is a diagram of the optical path viewed in the direction of the Z axis, and a part (c) is a diagram of the spots of light beams on an optical disk as viewed in a normal direction to the surface of the optical disk.

Figure 4:
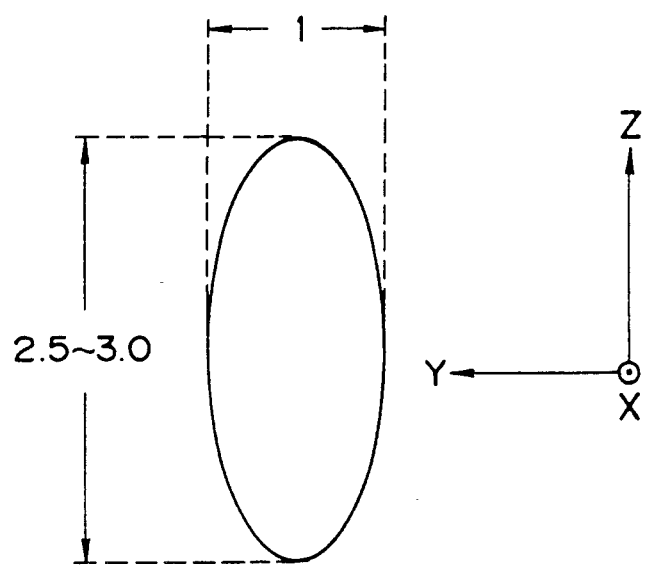
FIG. 4 is a view showing the cross-sectional shape of a light beam emitted from a semiconductor laser.

The laser beam emitted from the semiconductor laser 1 is the P polarized light parallel to the plane of FIG. 1, and is converted into the collimated beam by the collimating lens 3. As shown in FIG. 4, the cross-sectional emission distribution of the collimated beam on this occasion is in the shape of an ellipse whose major axis extends in a direction perpendicular to the direction of polarization (in the Z direction in FIG. 1) and in which the ratio between the major axis and the minor axis is about 2.5:1 − 3:1. This shape is due in large part to the shape of the light emission face of the semiconductor laser 1. As stated earlier, the elliptical shape is corrected into a circle by the prism 8a. When the collimated beam is incident upon the diffraction grating 7, the latter generates secondary light (light of orders +1, +2 and +3 in the example of FIG. 5) in the direction of the Z axis, as illustrated in FIG. 5. The light of order 0 and the secondary light from the diffraction grating 7 enters the beam shaping prism 8a at an angle of incidence of about 72° ($\theta = 72°$ in FIG. 5). The prism 8a is made of glass BK7, so that the incident beams are refracted at an angle of refraction of about 39° ($\theta = 39°$ in FIG. 5), and the refracted light beams enter the PBS 8b. In FIG. 5, the illustration of PBS 8b is omitted in order to avoid complicating the drawing. Since the incident beams entering the PBS 8b are the P polarized light, they pass through the PBS 8b without any change and are corrected into circularly polarized light by the quarter-wave plate 8c. The beams of the circularly polarized light are focused on the surface of the optical disk 9 by the objective lens 4, and are reflected therefrom.

Figure 7A:
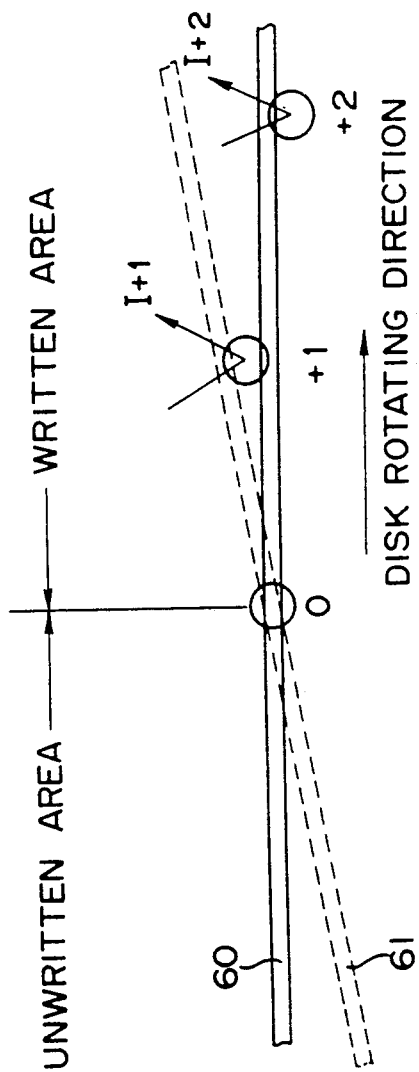
FIG. 7A is a view for describing the positional relationship among light beams of orders 0, +1 and +2 and the rotating direction and write regions of the optical disk.
Figure 7B:
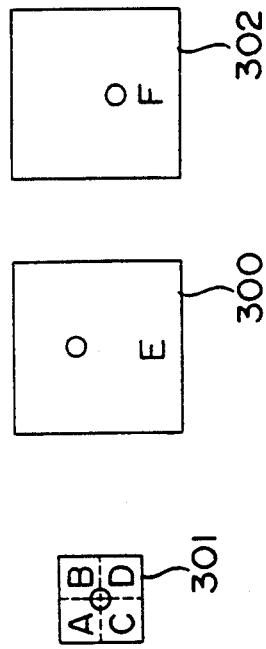
FIG. 7B is a view showing the construction of a six-sector detector used in the embodiment.

With reference to FIG. 1, the reflected light from the disk 9 is converted into a collimated beam by the objective lens 4. Thereafter, the beam is polarized into the S polarized light this time by the quarter-wave plate 8c, and the polarized light enters the PBS 8b again. Since the S polarized light is reflected by the PBS 8b, it is condensed on the six-sector detector 2 by the condenser 5 as well as the cylindrical lens 6. The shape of the light-receiving face of the detector 2 is shown in FIG. 7B. That is, the six-sector detector 2 is such that a four-sector detector 301 for producing signals for focusing and for reading data and two detectors 300 and 302 for tracking are arrayed as shown in FIG. 7B, and it is basically different in arrangement from the prior-art detector shown in FIG. 9B. The reason for the difference will be described below.

The control (focusing servo control) in which the objective lens 4 is controlled so as to condense the beam on the optical disk is based on what is referred to as the "astigmatism method". More specifically, aberration is provided by the condenser 5 and the cylindrical lens 6, and the combined output:

$$(A+D)-(B+C)$$

of the light-receiving elements 301 of the six-sector detector 2 is used as a focusing error signal. This principle is well known and does not require explanation.

The tracking method peculiar to this embodiment will now be described with reference to FIGS. 1 and 5. This tracking method should be referred to as an "improved tri-beam method", in which the light beam of order 0 and the light beam of orders +1 and +2 (or orders −1 and −2) are generated by optical elements skillfully arranged on the optical path, so as to utilize the light beam of order 0 for data reading and for focusing servo control and the light beams of orders +1 and +2 (or the orders of −1 and −2) for tracking.

Referring to FIG. 5 again, the improved tri-beam method will be described in more detail. FIG. 5(a) illustrates a situation in which the single collimated laser beam is diffracted into the plurality of diffracted light beams by the diffraction grating 7, with the Y axis taken in a direction perpendicular to the plane of the drawing. The light beam of order 0 and the secondary light beams enter the shaping prism 8a. This prisms 8a has two important functions. The first is to shape the substantially elliptical laser beam (refer to FIG. 4) so as to become substantially circular, and the second is to distribute the secondary light beams in the shape of a circular arc, as shown in FIG. 6, on a plane normal to the optical axis of the light beam of order 0.

Figure 9A:
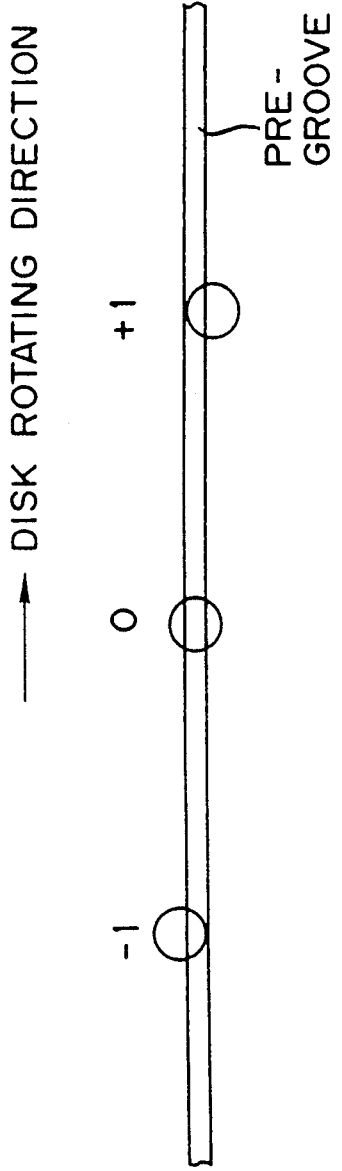
FIGS. 9A, 10A and 10B are views for describing the disadvantages of prior-art techniques.
Figure 9B:
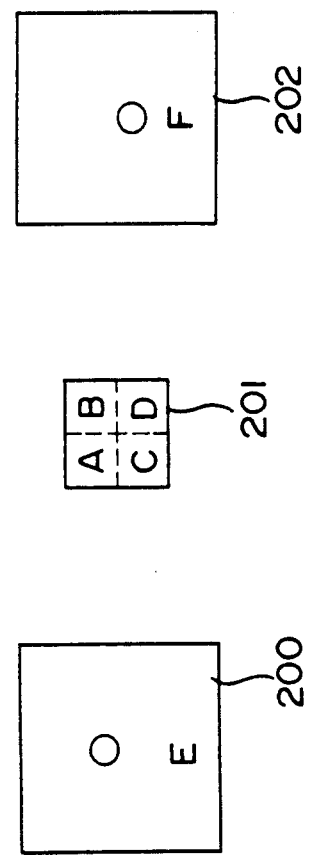
FIG. 9B is a view showing the arrangement of the detectors of an optical head as based on a prior-art tri-beam method.

The shape of the spot on the beam from the laser diode 1 is elliptical and does not change even when the beam is diffracted by the diffraction grating 7. Accordingly, the shape of the spot of each of the secondary light beams from the diffraction grating 7 is substantially elliptical, as shown in FIG. 4, and the elliptical shape is made circular by the prism 8a. Thus, the spots of the respective secondary light beams are shaped into circles, but they are distributed on an imaginary circular arc 50 as shown in FIG. 6. That is, when the prism 8a for the first function, namely the circularizing function, is situated at the stage succeeding the diffraction grating 7, it simultaneously performs the second function. The first function is performed to effectively utilize the light beam of the semiconductor laser of low power and has long been performed in the art. In the prior-art optical head, the shaping prism is located ahead of the diffraction grating, and there is no optical head available in which the diffraction grating 7 is located at the stage preceding the shaping prism 8a as in this embodiment. The reason is that, in the prior art, the single beam of elliptical cross-section is first shaped into the single beam of circular cross-section, whereupon the aligned light beams of orders 0, +1 and −1, as shown in FIG. 9A, are obtained from the single circular beam. Therefore, it has not been possible to situate the shaping prism behind the diffraction grating.

Figure 6:
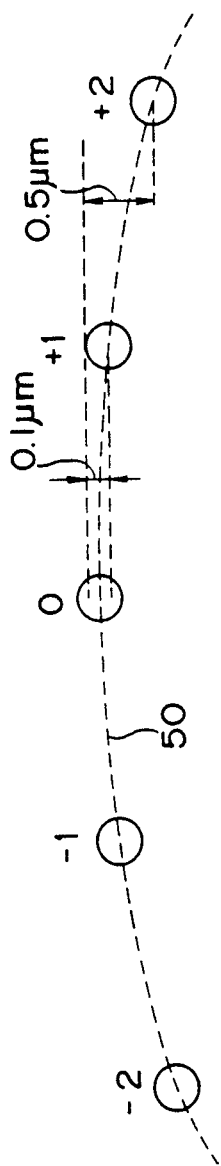
FIG. 6 is a view showing the distribution of diffracted light beams that have been refracted by a shaping prism according to the embodiment.

The mechanism of beam shaping will be described next followed by the reason why the distribution of the beams as shown in FIG. 6 is attained when the diffraction grating 7 is installed in front of the prism 8a.

Letting $\theta$ denote the angle of incidence of the light beam of order 0, $\phi$ denote the angle of refraction thereof, and n denote the refractive index of the prism 8a, the following relation holds:

$$n = \frac{\sin \theta}{\sin \phi}$$

Therefore, the light beam of order 0 is magnified $$\frac{\cos \phi}{\cos \theta}$$

times in the direction of the Y axis (in the direction of the minor axis in FIG. 4). In this embodiment, the cross-sectional shape of the laser beam is the ellipse in which the ratio between the major axis and the minor axis is about 2.5:1 − 3:1, as shown in FIG. 4. On the assumption that the refractive index of the glass (BK7) of the shaping prism 8a is 1.51 (for a wavelength of 830 nm), the angle of incidence $\theta$ of the light beam of order 0 on the prism 8a becomes 72°. Thus, the beam refracted by the shaping prism 8a is shaped to have an axial ratio of about 1:1 in cross section. Owing to the shaping, the output from the semiconductor laser 1 is utilized for reading/writing data and for tracking without being wasted.

The angles of incidence of the secondary light beams other than the zero-order light beam on the shaping prism 8a become greater than the angle of incidence of the zero-order light beam. As a result, the angles of refraction of the secondary light beams become greater. Therefore, the secondary light beams from the shaping prism 8a are respectively shaped to be circular, but their distribution is curved, as illustrated in FIG. 6. By way of example, it is assumed that the refractive index of the glass (BK7) of the prism 8a is 1.51, that the angle of incidence $\theta$ of the zero-order light beam on the shaping prism 8a is 72°, that the angle of separation between the light beams of the orders 0 and 1 is 0.5°, that the angle of separation between the light beams of the orders 0 and 2 is 1°, and that the focal distance of the objective lens 4 is 4 mm. In such case, the shifts of the first-order and second order light beams relative to the zero- order light beam in the tracking direction (the radial direction of the disk) become about 0.1 um and 0.5 um, respectively.

Thus, when the arrangement in which the diffraction 7 is located at the stage preceding the shaping prism 8a is adopted, the plurality of beams having the circular arc distribution as shown in FIG. 6 are projected onto the surface of the disk 9. As shown in FIG. 7A, the pre-groove of the disk and the plurality of beams spots are brought into a positional relationship in which the light beam of order 0 is centered on the pre-groove and in which this pre-groove is held between the light beams of the orders +1 and +2. Such a positional relationship is established by rotating the entire optical head about the optical axis of the objective lens thereby to correct the positional relationship between the optical head and the disk surface. In FIG. 7A, numeral 60 indicates the pre-groove after the correction of the positional relationship stated above, and numeral 61 the pre-groove before correction. Such a correction can also be made by changing the orientation of the diffraction grating 7 and the orientation of pre-groove in FIG. 1 so as to establish the positional relationship of the beams and the pre-grooves as illustrated in FIG. 7A.

When the optical disk is normally tracked, the zero-order light beam is projected on the pre-groove, and the +1−, +2-order light beams are projected on positions which are equally distant from the pre-groove. The reflected light of the light beams of the orders 0, +1, +2 is received by the six-sector detector 2, as shown in FIG. 7B. Letting E and F denote signals from the respective light-receiving elements 300 and 302, tracking servo control may be performed so as to null the error signal $$E - \alpha_{12} F$$

where $\alpha_{12}$ indicates the ratio between the light quantities of the first- and second-order light beams. Such a correction is made because, in general, the light quantity of the secondary light decreases with a rise in the order thereof. It is to be noted that, even if the coefficient $\alpha$ is not "1", the coefficient is not changed by the tracking operation because it is the ratio between the light quantities of the first-order and second-order light beams. Therefore, the coefficient does not form the variable factor of an offset.

Except for the arrangement, the light-receiving elements 300–302 may be exactly the same as those of the prior art.

Effects derived from the embodiment shown in FIG. will now be described.

FIG. 7A illustrates an aspect in which a writing diffracted beam lies at the rearmost position in the rotating direction of the optical disk. In this case, the rotating direction of the optical disk is rightward as view in the drawing, and the zero-order light beam generated by the optical head of the embodiment in FIG. 1 is employed as the writing beam, while the diffracted light beams of orders +1 and +2 are employed for tracking. Both the light beams of orders +1 and +2 are projected on the written areas of the optical disk in a writing mode and a playback mode. Accordingly, when the reflection intensities of the first-order and second-order diffracted beams are compared, $I_{+1} = \alpha_{12} I_{+2}$ holds, and a precise servo tracking signal is produced merely by subjecting the detector output signals E and F to the correction:

$$E - \alpha_{12} F$$

as stated before. This point will be described in greater detail. A change in the reflected light intensity, which depends upon the difference in disk material, referred to in the description of the prior art, often arises in the reflected light from the pitted part, namely from the written part. As already explained in relation to FIG. 9A, in the prior-art technique, the diffracted light beam of order $-1$ is projected on the unwritten area and the diffracted light of order $+1$ is projected on the written area, so that the offset magnitude must be altered for every material in order to compensate for the difference in material. By contrast, in this embodiment, the two tracking beams (the diffracted light beams of orders $+1$ and $+2$) are similarly projected on the written areas, and the reflection intensities thereof fluctuate similarly in spite of a change in the disk material, so that the change in the reflection intensity attributed to the difference is material is cancelled. In this respect, the optical head and the tracking method according to the embodiment overcome the disadvantage of the prior art.

Figure 10A:
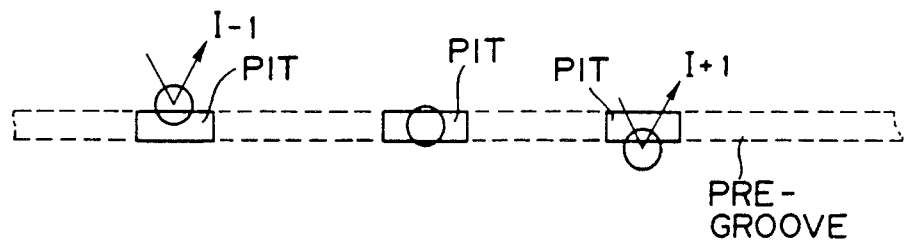
Figure 10B:
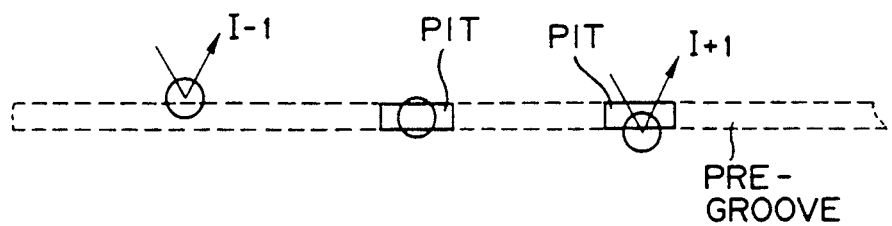

Moreover, as stated before, the difference between the light quantities of the diffracted beams of orders 1 and 2 is compensated for by the gain ratio $\alpha_{12}$. Since both the first-order and second-order light beams and second-order light beams are projected on similar areas, the difference between the light quantities of the diffracted beams does not give rise to an offset in the writing mode and reading mode. Therefore, once the gain ratio has been set at a prescribed value, stable tracking is realized in both the writing and reading modes. In the prior art, as explained in relation to FIGS. 10A and 10B, the $I_{-1}/I_{+1}$ ratio in the writing mode differs from that in the playback mode, so that the writing mode is required to be distinguished from the playback mode so as to form a different tracking signal ($E - \alpha F$ in contrast to $E - F$). Also in this respect, the tracking method of the embodiment overcomes the disadvantage of the prior art.

Further, the tracking method according to the above embodiment is realized by altering the arrangement of the optical elements in the optical head; hence, the specifications of the conventional optical disk media need not be subjected to any correction.

Moreover, owing to the structure in which the diffraction grating 7 is situated at the stage preceding the shaping prism 8a, the beam shaping function and the secondary light distribution as shown in FIG. 6 are simultaneously attained. In this embodiment, therefore, no special optical element for establishing the secondary light distribution is added anew, but the abovementioned two functions are simultaneously fulfilled merely by changing the arrangement of the diffraction grating and the shaping prism, which are used also in the prior-art optical head. Accordingly, the embodiment is advantageous in point of cost. In addition, the optical head can be reduced in size and is less susceptible to the adverse influence of environmental changes, such as changes in temperature and vibration, owing to the simplification of the optical system.

Figure 8A:
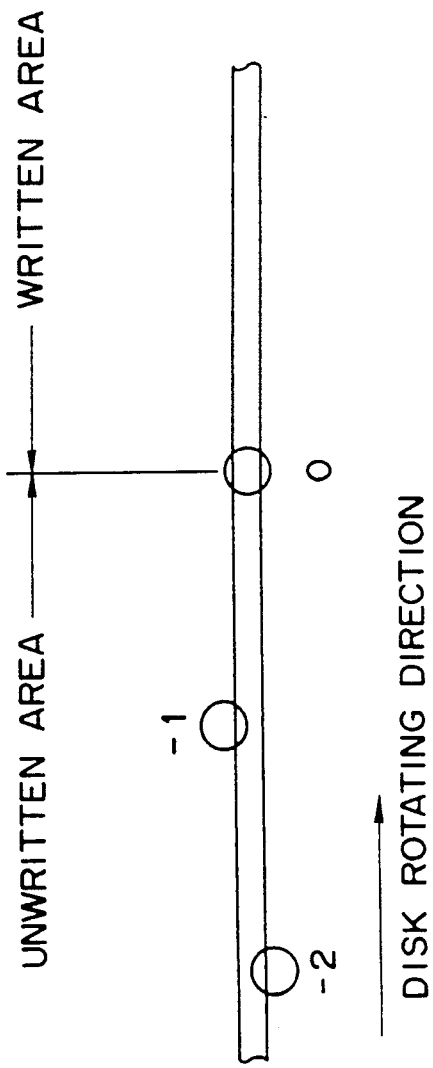
FIG. 8A is a view for describing a modified embodiment which concerns the arrangement of secondary light beams.

The foregoing embodiment is arranged so that the writing or reading diffracted beam is the diffracted light beam at the rearmost position in the rotating direction of the optical disk, while the two tracking secondary light beams at foremost positions in the same direction are projected on the written areas. Next, there will be proposed a modification according to which, unlike the foregoing embodiment, two tracking beams are collectively projected on unwritten areas, while a diffracted light beam at the foremost position in the rotating direction of the optical disk is employed as the writing or reading diffracted beam. As illustrated in FIG. 8A, the diffracted light beams of orders $-1$ and $-2$ projected on the unwritten areas are utilized for tracking. Even in such an arrangement, both beams are projected on the areas of the same reflecting condition, so that all the aforementioned features and effects of the foregoing embodiment are also achieved by the modification. In this case, the intensities of the reflected beams of the two secondary light beams in the writing mode become different from those in the reading mode, but the ratio between the light quantities of the two reflected beams is pertinent to the signal of servo tracking control. However, since the light quantity ratio does not change even with the arrangement of FIG. 8A, no problem arises.

Another modification to be stated below is also proposed. In the foregoing embodiment, the beam shaping prism 8a is utilized so as to attain the curved secondary light distribution as shown in FIG. 7A. Even with a different method, however, it is possible to generate secondary light beams the cross-sectional distribution of which is curved. That is, the secondary light beams in the distribution as shown in FIG. 7A can also be obtained by combining several diffraction gratings and prisms. By way of example, the diffraction gratings can be replaced with a "wedge"-shaped prism which performs multiple reflection.

Figure 8B:
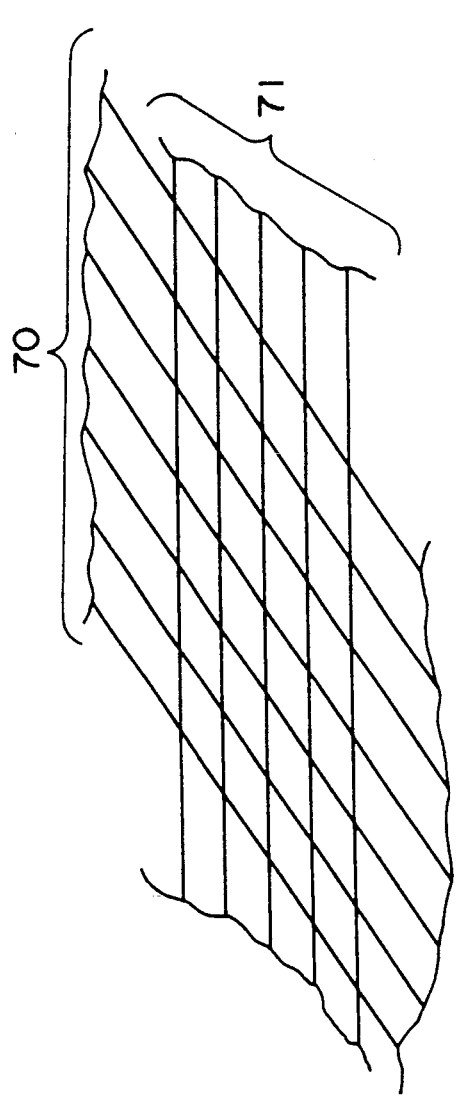
FIG. 8B is a view showing the construction of a modified embodiment of a diffraction grating as diffraction means.
Figure 8C:
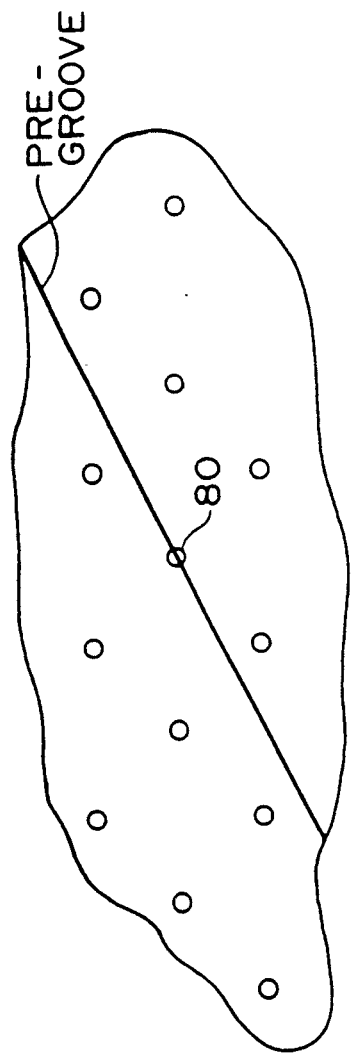
FIG. 8C is a view showing the distribution of light beams diffracted by the diffraction grating in FIG. 8B.

In addition, a secondary light distribution as shown in FIG. 8C can be attained without the shaping prism 8a by combining two diffraction gratings 70 and 71 of different grating patterns as illustrated in FIG. 8B. More specifically, secondary light diverging laterally is generated by the diffraction grating 71 the grating pattern of which is set parallel to the plane of FIG. 8B. Then, when the zero-order light and secondary light from the diffraction grating 71 is caused to enter the diffraction grating 70 located at an inclination with respect to the diffraction grating 71, the large number of secondary light beams shown in FIG. 8C are obtained. Assuming that a light beam 80 is the zero-order light in FIG. 8C, light beams between which the pre-groove is held as shown in FIG. 7A are selected from among the other secondary light beams.

Essentially, a light beam of order 0 and at least two secondary light beams are produced from a single laser beam by an optical system, the zero-order light beam is used as a main beam for reading or writing data, and from among the secondary light beams, two light beams in a positional relationship in which they are not aligned with the zero-order light beam in the cross-sectional distribution thereof are selected so as to be used as beams for detecting a tracking signal. This measure eliminates the necessity to provide servo signals with unequal magnitudes in a writing mode and playback mode as in the prior-art tri-beam method. The offset magnitudes are also unstable.

Though the zero-order light beam and the first-order and second-order light beams are respectively employed as the beam for data and the beams for tracking in the above embodiment, this is not always restrictive. The reason is that beams of desired powers can be generated by controlling numerical apertures, as stated earlier.

In addition, although the embodiments use $$E - \alpha_{12} F$$

as the tracking servo signal, the ratio between the light quantities of the first-order and second-order beams, namely, the coefficient $\alpha_{12}$, can also be set at "1" by changing the numerical aperture of the diffraction grating or changing the sectional shape of the grating.

As many apparently widely different embodiments of the present invention can be made without departing from the spirit and scope thereof, it is to be understood that the invention is not limited to the specific embodiments thereof except as defined in the appended claims.

What is claimed is:

1. An optical head having light beam generating means for generating a light beam, and being usable with WORM-type and phase change-type optical disk devices, comprising:
    a diffraction grating located on an optical path of the light beam for diffracting the light beam into at least three diffracted light beams;
    a prism for refracting said at least three diffracted light beams from said diffraction grating, said diffraction grating diffracting at least three diffracted light beams so that said three diffracted light beams enter said prism obliquely, so as to establish a positional relationship in which said at least three diffracted light beams do not lie on a single line in a cross-sectional distribution thereof, wherein one of the at least three diffracted light beams that lies at aforemost or rearmost position in a forward rotating direction of said optical disk, is employed for reading or writing data; and
    two first light-receiving means disposed on an optical path of reflected light of the remaining two diffracted light beams from said optical disk, and arranged at different positions for receiving the reflected light beams in order to produce a tracking servo signal.

2. The optical head according to claim 1, wherein said diffraction grating is located perpendicular to an optical axis of the light beam generated by said light beam generating means, said prism being so disposed that the refracted light beams of said at least three diffracted light beams from said prism are projected perpendicularly onto a surface of said optical disc.

3. The optical head according to claim 1, wherein the diffracted light beam lying at the foremost or rearmost position is a light beam of order 0, and the remaining two diffracted light beams are light beams of orders 1 and 2.

4. The optical head according to claim 1, further comprising second light-receiving means for receiving the reflected light beam from a surface of said disk, said reflected light being the diffracted light beam which lies at the foremost or rearmost position, a signal from said second light-receiving means being used for one or both playing back the read data and for a focusing servo control operation.

5. The optical head according to claim 1, wherein when the diffracted light beam lying at the foremost or rearmost position lies at said foremost position, the remaining light beams are projected on written areas of a surface of said optical disk in a writing mode and a playback mode.

6. The optical head according to claim 1, wherein when the diffracted light beam lying at the foremost or rearmost position lies at said rearmost position, the remaining diffracted light beams are projected on unwritten areas of a surface of said optical disk in a writing mode.

7. The optical head according to claim 1, wherein said prism has a refractive index of 1.5, and an angle of incidence of the diffracted light of said prism is 79°.

8. A tracking method for an optical head usable with WORM-type and phase change-type optical devices, comprising the steps of:
    diffracting a single light beam into three diffracted light beams by a diffraction grating;
    refracting said three diffracted light beams into three refracted light beams with a prism, said diffraction grating diffracting said three diffracted light beams so that said three diffracted light beams enter the prism obliquely and do not lie on a single straight line in a cross-sectional distribution thereof;
    employing as a beam, for reading or writing data, one of the three refracted light beams which lies at a foremost or rearmost position in a forward rotating direction of said optical disk; and
    employing the remaining two refracted light beams as beams for tracking.

9. The tracking method according to claim 8, wherein the refracted light beam lying at the foremost or rearmost position is projected on a pre-groove provided on said optical disk, and the remaining two refracted light beams are projected on positions which are substantially equidistant from said pre-groove in a direction normal to said pre-groove.

10. The tracking method according to claim 8, wherein the refracted light beam lying at the foremost or rearmost position is derived from a diffracted light beam of order 0 by said diffraction grating, and the remaining two refracted light beams are derived from light beams in the order of 1 and 2.

11. The tracking method according to claim 8, wherein when the refracted light beam which is employed as the data reading or writing beam lies at the foremost position in the forward rotating direction of said optical disk, the remaining diffracted light beams are projected on written areas of a surface of said optical disk in a writing mode and a playback mode.

12. The tracking method according to claim 8, wherein when the diffracted light beam which is employed as the data reading or writing beam lies at the rearmost position in the forward rotating direction of said optical disk, the remaining diffracted light beams are projected on unwritten areas of a surface of said optical disk in a writing mode.

* * * * *

UNITED STATES PATENT AND TRADEMARK OFFICE
CERTIFICATE OF CORRECTION

PATENT NO. : 5,062,096

DATED : October 29, 1991

INVENTOR(S) : Masaaki Takagi

It is certified that error appears in the above-identified patent and that said Letters Patent is hereby corrected as shown below:

Claim 1, column 13, line 50, change "aforemost" to --a foremost--.

Claim 4, column 14, line 8, after "both" insert --of--.

Signed and Sealed this

Second Day of March, 1993

Attest:

STEPHEN G. KUNIN

*Attesting Officer*   Acting Commissioner of Patents and Trademarks